(12) United States Patent
Klemm et al.

(10) Patent No.: US 12,050,164 B2
(45) Date of Patent: Jul. 30, 2024

(54) THROUGHFLOW MEASUREMENT SYSTEM

(71) Applicant: SICK Engineering GmbH, Ottendorf-Okrilla (DE)

(72) Inventors: Markus Klemm, Ottendorf-Okrilla (DE); Eric Starke, Ottendorf-Okrilla (DE); Mario Künzelmann, Ottendorf-Okrilla (DE)

(73) Assignee: SICK ENGINEERING GMBH, Ottendorf-Okrilla (DE)

( * ) Notice: Subject to any disclaimer, the term of this patent is extended or adjusted under 35 U.S.C. 154(b) by 169 days.

(21) Appl. No.: 17/876,222

(22) Filed: Jul. 28, 2022

(65) Prior Publication Data

US 2023/0044144 A1 Feb. 9, 2023

(30) Foreign Application Priority Data

Aug. 5, 2021 (DE) .......................... 102021120363.5

(51) Int. Cl.
*G01N 11/04* (2006.01)
*G01F 1/667* (2022.01)
(Continued)

(52) U.S. Cl.
CPC ............. *G01N 11/04* (2013.01); *G01F 1/667* (2013.01); *G01F 1/69* (2013.01)

(58) Field of Classification Search
CPC . G01F 1/668; G01F 1/667; G01F 1/69; G01F 1/684; G01F 1/6845; G01F 1/662; G01N 2203/021; G01N 11/04
See application file for complete search history.

(56) References Cited

U.S. PATENT DOCUMENTS 4,317,178 A 2/1982 Head
4,320,650 A 3/1982 Kita
(Continued)

FOREIGN PATENT DOCUMENTS

CN 209069358 U 7/2019
DE 19957956 A1 6/2001
(Continued)

OTHER PUBLICATIONS

Search Report issued on Nov. 21, 2022 for application No. EP 22181446.0.
(Continued)

*Primary Examiner* — Peter J Macchiarolo
*Assistant Examiner* — Anthony W Megna Fuentes
(74) *Attorney, Agent, or Firm* — Nath, Goldberg & Meyer; Jerald L. Meyer; Morgan D. Rosenberg

(57) ABSTRACT

A throughflow measurement system for measuring a fluid throughflow through a pipe includes a first measurement arrangement having at least two ultrasonic transducers and that is configured to determine a value for the fluid throughflow through the pipe on the basis of transit times of ultrasonic signals transmitted and received with and against the flow. A second measurement arrangement includes a plurality of hot-wire sensors that are arranged distributed over the cross-section of the pipe and that are each configured to determine a local flow value. An evaluation device is in signal connection with the first measurement arrangement and the second measurement arrangement and is configured to determine a flow profile on the basis of the local flow values determined by the hot-wire sensors and to modify the value for the fluid throughflow, which is determined by the first measurement arrangement, on the basis of the determined flow profile.

13 Claims, 3 Drawing Sheets

(51) Int. Cl.
*G01F 1/684* (2006.01)
*G01F 1/69* (2006.01)
*G01F 1/66* (2022.01)

(56) References Cited

U.S. PATENT DOCUMENTS

| | | | |
|---|---|---|---|
| 5,661,236 | A | 8/1997 | Thompson |
| 6,748,811 | B1 | 6/2004 | Wanaga et al. |
| 7,093,502 | B2 | 8/2006 | Kupnik et al. |
| 7,712,382 | B2 | 5/2010 | Takeda et al. |
| 8,360,635 | B2 | 1/2013 | Huang et al. |
| 9,068,870 | B2 | 6/2015 | Priyadarshana et al. |
| 9,556,798 | B2 | 1/2017 | Ekanayake et al. |
| 10,101,186 | B2 | 10/2018 | Pretre |
| 2012/0055263 | A1 | 3/2012 | Konzelmann |
| 2014/0208755 | A1 | 7/2014 | Ekanayake et al. |
| 2016/0334286 | A1* | 11/2016 | Tanaka .................. G01K 17/16 |
| 2018/0058889 | A1 | 3/2018 | Arwatz et al. |

FOREIGN PATENT DOCUMENTS

| | | |
|---|---|---|
| DE | 102008020874 A1 | 11/2009 |
| DE | 102014100481 A1 | 7/2014 |
| DE | 102016112295 A1 | 1/2018 |
| DE | 102019103674 A1 | 8/2020 |
| DE | 102019117151 A1 | 12/2020 |
| KR | 101865801 B1 | 6/2018 |
| WO | 2020210355 A1 | 10/2020 |

OTHER PUBLICATIONS

Office Action issued on Mar. 8, 2022 for application No. DE10 2021 120 363.5.

* cited by examiner

THROUGHFLOW MEASUREMENT SYSTEM

The present invention relates to a throughflow measurement system for measuring a fluid throughflow through a pipe.

Fluid throughflow measurement systems are used in many fields of technology to determine the quantity of a gas or of a liquid flowing through a pipe, a line, a channel or the like per unit of time. Such throughflow measurement systems in the form of counters, for example, serve to determine delivery quantities and/or consumption quantities of gases or liquids.

The accuracy of throughflow measurements generally depends on the uniformity of the flow profile. Inhomogeneous or disturbed flow profiles are frequently present in practice, which adversely affects the reliability of the measurements. There is therefore the endeavor to provide throughflow measurement systems having an increased accuracy and robustness. Since throughflow measurement systems are subject to considerable cost pressure in many application areas, complex and/or expensive measures are undesirable, however.

It is an object of the invention to specify a throughflow measurement system that, with a structurally simple design and low manufacturing costs, has a high measurement accuracy even when irregularities of the flow profile are present.

The object is satisfied by a throughflow measurement system unit having the features of claim 1.

A throughflow measurement system in accordance with the invention comprises a first measurement arrangement that comprises at least two ultrasonic transducers and that is configured to determine a value for the fluid throughflow through the pipe on the basis of transit times of ultrasonic signals transmitted and received with and against the flow; a second measurement arrangement that comprises a plurality of hot-wire sensors that are arranged distributed over the cross-section of the pipe and that are each configured to determine a local flow value; and an evaluation device that is in signal connection with the first measurement arrangement and with the second measurement arrangement and that is configured to determine a flow profile on the basis of the local flow values determined by the hot-wire sensors and to modify the value for the fluid throughflow, which is determined by the first measurement arrangement, on the basis of the determined flow profile.

By means of the hot-wire sensors arranged in a distributed manner, it is possible to recognize irregularities and/or temporal changes of the flow profile and to take them into account in the determination of the fluid throughflow. The evaluation device can therefore, if necessary, correct the determined value for the fluid throughflow, with a particularly robust and accurate measurement resulting therefrom. One advantage of the use of hot-wire sensors for determining the flow profile is that they are relatively small, inexpensive, and easy to evaluate. It is in particular not necessary to provide a complex signal processing for the hot-wire sensors. Temperature or pressure changes in the pipe do not significantly influence the measurement since the absolute value for the fluid throughflow through the pipe is determined by means of the ultrasound-based first measurement arrangement. The second measurement arrangement, in contrast, does not have to provide exact absolute values since only the ratios of the individual signals of the hot-wire sensors with respect to one another are decisive for the determination of the flow profile. Thus, the combination in accordance with the invention of an ultrasound-based absolute value measurement and a hot-wire-based profile recognition enables an accurate and reliable throughflow measurement despite a simple and space-saving measurement design.

The fluid throughflow can be the volume flow or the mass flow, in particular in relation to the total pipe cross-section, or a value proportional thereto. The hot-wire sensors can, for example, detect the local flow rate of the fluid as the local flow value.

Hot-wire sensors are anemometers that comprise a hot-wire element which can be flowed around by the fluid. Due to the flowing around, a heat transport into the fluid takes place whose extent depends on the local flow rate. Since the electrical properties of the hot wire, for example the electrical resistance, are temperature-dependent, the local flow rate can be concluded via a simple electrical measurement. The hot wire can, for example, be tensioned between two steel tips and/or can be held in a ceramic holder. Hot-wire anemometers are also called hot-nano-wire anemometers, if applicable. In general, heating elements that are not wire-like in the classical sense are also designated as "hot wire". For example, anemometers are known that have flat, film-like heating elements. In the present disclosure, the term "hot wire" is also intended to mean such heating elements.

The first measurement arrangement can be adapted to determine the value for the fluid throughflow by means of the transit time difference method. A corresponding ultrasound measurement apparatus and a corresponding method are described in DE 10 2016 112 295 A1, for example. Depending on the application, the first measurement arrangement can comprise a single-path system or a multi-path system of ultrasonic transducers.

The evaluation device is preferably configured to modify the value for the fluid throughflow, which is determined simultaneously with the local flow values, on the basis of the determined flow profile. That value for the fluid throughflow is therefore modified which was determined at the time of the flow profile determination. It is thus ensured that temporal changes of the flow profile are correctly taken into account.

The value for the fluid throughflow determined by the first measurement arrangement can be modified on the basis of the determined flow profile by multiplying said value by a correction factor that is based on the determined flow profile. For example, the correction factor can be based on a ratio between an average of all the local flow values and the local flow value of a reference location.

In accordance with an embodiment of the invention, the second measurement arrangement is spaced apart from the first measurement arrangement with respect to the direction of flow and/or the axis of the pipe. Thus, both measurement arrangements can use the complete pipe cross-section for the measurement. The second measurement arrangement is preferably arranged upstream of the first measurement arrangement.

The hot-wire sensors of the second measurement arrangement can be attached to a common carrier. This facilitates an accurate positioning of the hot-wire sensors relative to one another and relative to the wall of the pipe. The carrier can in this respect be fastened to the pipe wall or can be formed in one piece therewith.

In accordance with an embodiment of the invention, the carrier is composed of areal flow-conducting sections. This is advantageous in that the flow-conducting sections counteract a disturbance of the flow. The flow-conducting sections are preferably at least substantially smooth and/or extend along the direction of flow.

The carrier can be designed as a flow conditioner, whereby disturbed flow profiles are conditioned in the direction of undisturbed flows again, in particular at a point located upstream of the first measurement arrangement. The carrier designed as a flow conditioner can have plates, metal sheets, inner pipes and the like that are oriented in the direction of an undisturbed flow. In this way, an unwanted swirl in the flow can in particular be successfully counteracted. Since the carrier fulfills a dual function as a holder for the hot-wire sensors and as a flow conditioner, a corresponding throughflow measurement system has a particularly compact design.

A further embodiment of the invention provides that the at least two ultrasonic transducers of the first measurement arrangement define a measurement path extending obliquely with respect to the direction of flow. In such an arrangement, a transit time difference between ultrasonic signals that is dependent on the flow rate results on the outward path, on the one hand, and on the return path, on the other hand. For example, the at least two ultrasonic transducers of the first measurement arrangement can be arranged with measurement heads facing towards one another at an inner wall of the pipe. The measurement path can generally also extend in the direction of flow.

The at least two ultrasonic transducers of the first measurement arrangement are preferably each configured to transmit and to receive ultrasonic signals. The measurement path formed between the ultrasonic transducers can thus be passed through both in the one direction and in the other direction.

The hot-wire sensors of the second measurement arrangement can comprise microelectromechanical systems (MEMS). For example, the hot wire can be applied on or at a substrate together with associated electrical components. An opening or a cut-out in the substrate can assist the flowing around. MEMS-based hot-wire anemometers are simple and inexpensive to manufacture. Furthermore, they can be miniaturized and thus enable a particularly precise measurement of the local flow rate.

In accordance with a further embodiment of the invention, the hot-wire sensors of the second measurement arrangement are connected to or integrated into a common circuit board. This enables a particularly simple design of a throughflow measurement system. An amplifier circuit, a driver circuit, and/or an evaluation circuit can also be applied to the common circuit board.

A throughflow measurement system in accordance with the invention can comprise a third measurement arrangement that is spaced apart from the second measurement arrangement with respect to the direction of flow and/or the axis of the pipe and that comprises a plurality of hot-wire sensors that are arranged distributed over the cross-section of the pipe and that are each configured to determine a local flow value of the fluid, wherein the evaluation device is in signal connection with the third measurement arrangement and is configured to determine changes of the flow profile along the direction of flow on the basis of a comparison of signals of the second and third measurement arrangement. In this way, changes of the flow profile that occur between the first measurement arrangement and the second measurement arrangement or within the measurement path of the first measurement arrangement can also be taken into account.

A further embodiment of the invention provides that the evaluation device is configured to determine the viscosity of the fluid on the basis of the determined flow profile. The second measurement arrangement can therefore be used to obtain additional information about the fluid flow.

A throughflow measurement system in accordance with the invention can comprise a temperature measurement device, wherein the evaluation device is in signal connection with the temperature measurement device and is configured to modify the value for the fluid throughflow, which is determined by the first measurement arrangement, on the basis of a temperature detected by the temperature measurement device. The measurement accuracy can hereby be further increased.

Further developments of the invention can also be seen from the dependent claims, from the description, and from the enclosed drawings.

The invention will be described in the following by way of example with reference to the drawings.

Figure 1:
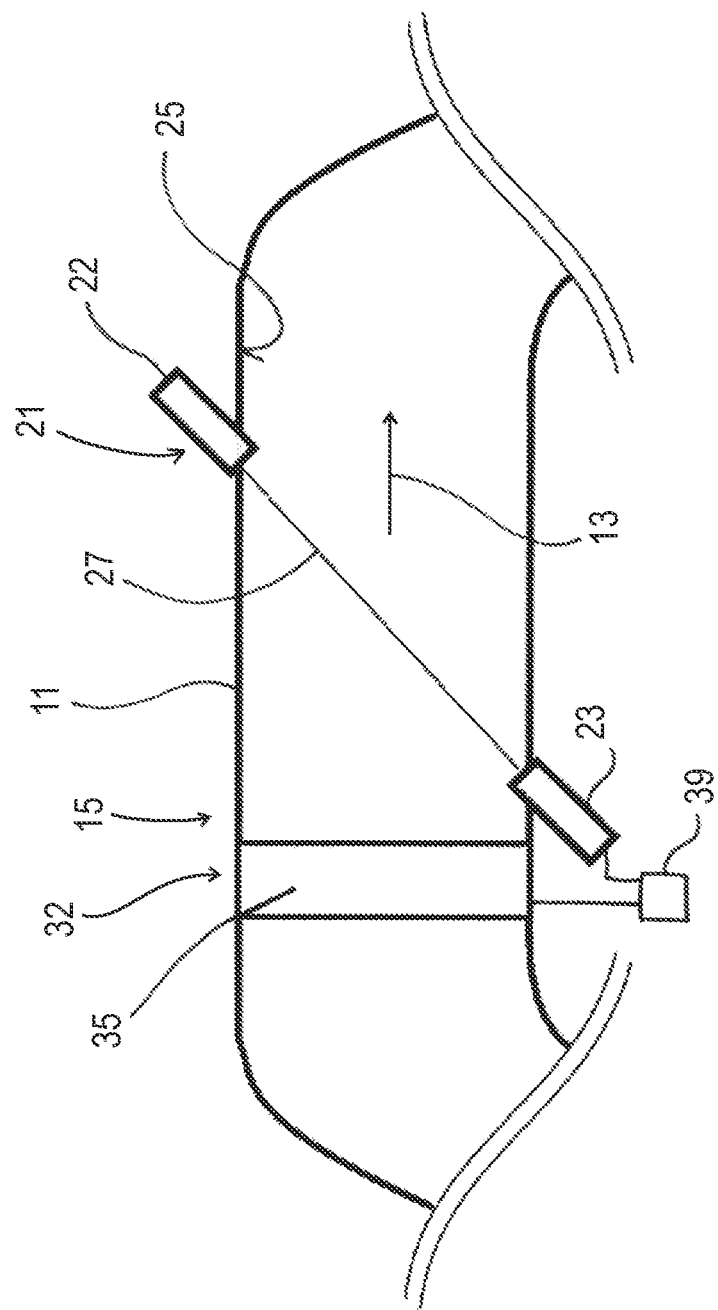
FIG. 1 is a simplified lateral sectional view of a throughflow measurement system in accordance with the invention.

In FIG. 1, a pipe 11 is shown which can be flowed through by a fluid in a direction of flow 13. The pipe 11 can be part of a line system or channel system. A throughflow measurement system 15 in accordance with the invention for measuring the fluid throughflow through the pipe 11 is associated with the pipe 11. The throughflow measurement system 15 comprises a first measurement arrangement 21 that comprises two ultrasonic transducers 22, 23 and that is configured to determine a value for the fluid throughflow through the pipe 11 on the basis of transit times of ultrasonic signals transmitted and received with and against the flow. In the embodiment shown, the two ultrasonic transducers 22, 23 are fastened to a wall 25 of the pipe 11 and define a measurement path 27 extending obliquely with respect to the direction of flow 13. The two ultrasonic transducers 22, 23 are each configured to alternately transmit and receive ultrasonic signals and are connected to an electronic evaluation unit, not shown, that can both control the transmission of the ultrasonic signals and evaluate received ultrasonic signals. From a difference in the transit times of the ultrasonic signals for the outward and return paths of the measurement path 27, the evaluation unit of the first measurement arrangement 21 can determine a value for the fluid throughflow through the pipe 11, in particular a volume flow or a mass flow, taking into account the geometric relationships. In detail, the measurement system 21 can be designed as described in DE 10 2016 112 295 A1.

Figure 2:
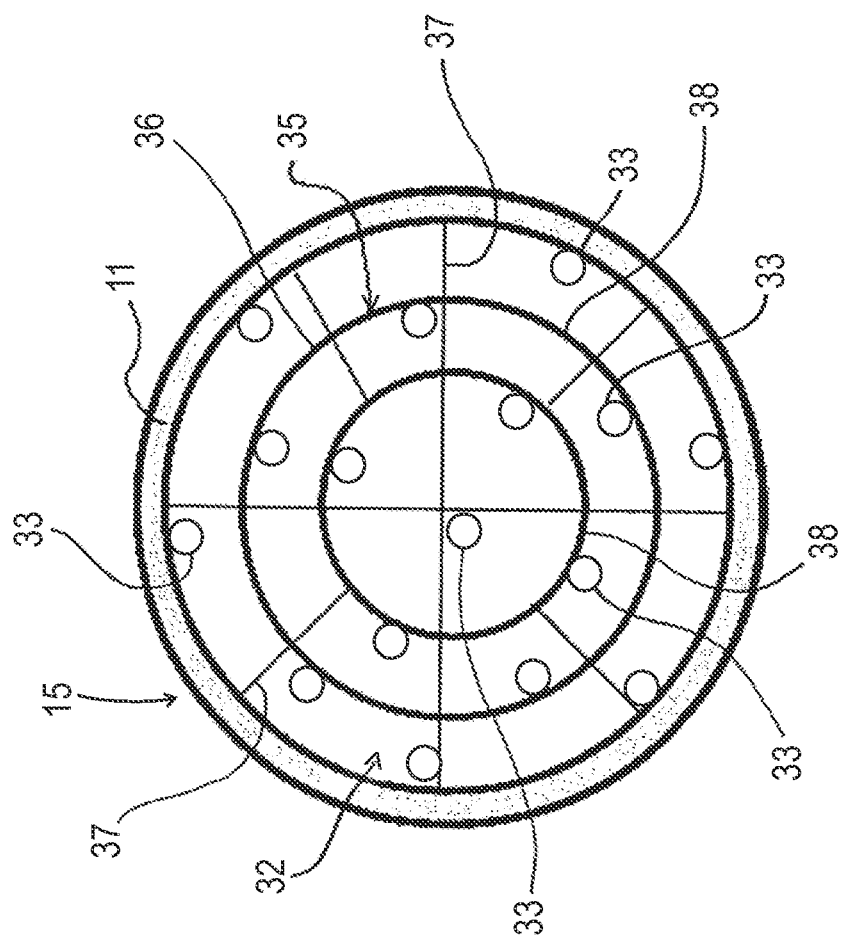
FIG. 2 shows the throughflow measurement system in accordance with FIG. 1 in a front view.

A second measurement arrangement 32 of the throughflow measurement system 15 is provided upstream of the first measurement arrangement 21. As can be seen in FIG. 2, the second measurement arrangement 32 comprises an array of hot-wire sensors 33 that are arranged distributed over the cross-section of the pipe 11. For example, the hot-wire sensors 33 are designed as microelectromechanical systems (MEMS). They are each in a signal connection with an evaluation unit, not shown, of the second measurement arrangement 32.

A carrier 35 composed of plastic, a fiber composite material, or metal is provided for positioning the hot-wire sensors 33 of the second measurement arrangement 32 and also functions as a flow conditioner. For a conditioning of the flow, the carrier 35 is composed of areal flow-conducting sections 36. As shown, both planar flow-conducting sections 37 and curved flow-conducting sections 38 are present. The hot-wire sensors 33 are each fastened to, for example adhesively bonded to, the flow-conducting sections 36.

The throughflow measurement system 15 furthermore comprises an electronic evaluation device 39 that is in a wireless or wired signal connection with respective evaluation units of the first measurement arrangement 21 and the second measurement arrangement 32 and that is configured to determine a flow profile of the fluid flow on the basis of output signals of the hot-wire sensors 33 and to correct the value for the fluid throughflow, which is determined by the first measurement arrangement 21, on the basis of this flow profile. For this purpose, the value for the fluid throughflow can, for example, be multiplied by a correction factor that indicates an average flow in relation to the local flow at a reference position. The value multiplied by the correction factor is output by the throughflow measurement system 15 as a measured value.

The electronic evaluation device 39 can further be configured to derive additional values from the determined flow profile, for example the viscosity of the fluid. To increase the measurement accuracy, the throughflow measurement system 15 can be provided with a temperature measurement device 42, wherein the electronic evaluation device 39 is configured to compensate falsifications of measured values due to temperature changes. To also be able to take into account changes of the flow profile on the way from the second measurement arrangement 32 to the first measurement arrangement 21 or in the course of the measurement path 27 of the first measurement arrangement 21, a further carrier comprising hot-wire sensors could also be provided downstream of the first measurement arrangement 21.

The evaluation device 39, which is preferably applied to a single circuit board, can have a relatively simple design since, for example, no complex signal processing is necessary for determining the flow profile by means of the hot-wire sensors 33. A throughflow measurement system 15 in accordance with the invention is also suitable for pipes 11 having small nominal diameters since, due to the separate determination of the flow profile, only a limited number of measurement paths 27 of the ultrasound system, ideally only a single measurement path 27, is required to also achieve an acceptable measurement accuracy in the case of a non-uniform flow. Since the base value for the fluid throughflow is based on an ultrasound measurement, the measurement is more robust than would be possible with a pure hot-wire system.

Figure 3:
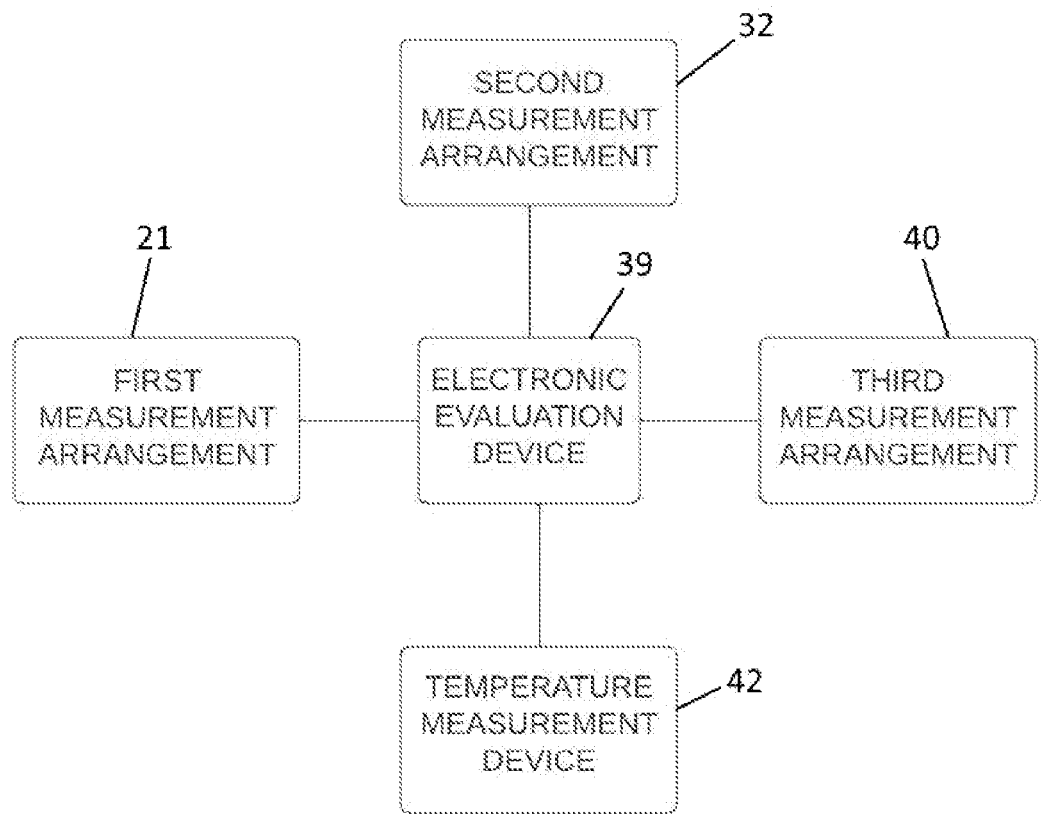
FIG. 3 is a block diagram showing system components of the throughflow measurement system.

As shown in FIG. 3, the throughflow measurement system 15 may also include a third measurement arrangement 40 that is spaced apart from the second measurement arrangement 32 with respect to the direction of flow 13 and/or the axis of the pipe 11. The third measurement arrangement 40 includes a plurality of hot-wire sensors that are arranged distributed over the cross-section of the pipe 11 and that are each configured to determine a local flow value of the fluid. The evaluation device 39 is in signal connection with the third measurement arrangement 40 and is configured to determine changes of the flow profile along the direction of flow 13 on the basis of a comparison of signals of the second and third measurement arrangements 32, 40, respectively. In this way, changes of the flow profile that occur between the first measurement arrangement 21 and the second measurement arrangement 32 or within the measurement path 27 of the first measurement arrangement 21 can also be taken into account.

REFERENCE NUMERAL LIST 11 pipe
13 direction of flow
15 throughflow measurement system
21 first measurement arrangement
22 ultrasonic transducer
23 ultrasonic transducer
25 wall
27 measurement path
32 second measurement arrangement
33 hot-wire sensor
35 carrier
36 flow-conducting section
37 planar flow-conducting section
38 curved flow-conducting section
39 electronic evaluation device

The invention claimed is:

1. A throughflow measurement system for measuring a fluid throughflow through a pipe comprising:
    a first measurement arrangement that comprises at least two ultrasonic transducers and that is configured to determine a value for the fluid throughflow through the pipe on the basis of transit times of ultrasonic signals transmitted and received with and against a flow;
    a second measurement arrangement that comprises a plurality of hot-wire sensors that are arranged distributed over a cross-section of the pipe and that are each configured to determine a local flow value; and
    an evaluation device that is in signal connection with the first measurement arrangement and with the second measurement arrangement and that is configured to determine a flow profile on the basis of the local flow values determined by the hot-wire sensors and to modify the value for the fluid throughflow, which is determined by the first measurement arrangement, on the basis of the determined flow profile.

2. The throughflow measurement system in accordance with claim 1,
    wherein the evaluation device is configured to modify the value for the fluid throughflow, which is determined simultaneously with the local flow values, on the basis of the determined flow profile.

3. The throughflow measurement system in accordance with claim 1,
    wherein the second measurement arrangement is spaced apart from the first measurement arrangement with respect to a direction of flow and/or an axis of the pipe.

4. The throughflow measurement system in accordance with claim 1,
    wherein the hot-wire sensors of the second measurement arrangement are attached to a common carrier.

5. The throughflow measurement system in accordance with claim 4,
    wherein the carrier is composed of areal flow-conducting sections.

6. The throughflow measurement system in accordance with claim 4,
    wherein the carrier is designed as a flow conditioner.

7. The throughflow measurement system in accordance with claim 1,
    wherein the at least two ultrasonic transducers of the first measurement arrangement define a measurement path extending obliquely with respect to a direction of flow.

8. The throughflow measurement system in accordance with claim 1,
    wherein the at least two ultrasonic transducers of the first measurement arrangement are each configured to transmit and to receive ultrasonic signals.

9. The throughflow measurement system in accordance with claim 1,
    wherein the hot-wire sensors of the second measurement arrangement comprise microelectromechanical systems.

10. The throughflow measurement system in accordance with claim 1,
    wherein the hot-wire sensors of the second measurement arrangement are connected to or integrated into a common circuit board.

11. The throughflow measurement system in accordance with claim 1,
    comprising a third measurement arrangement that is spaced apart from the second measurement arrangement with respect to a direction of flow and/or an axis of the pipe and that comprises a plurality of hot-wire sensors that are arranged distributed over the cross-section of the pipe and that are each configured to determine a local flow value of the fluid, wherein the evaluation device is in signal connection with the third measurement arrangement and is configured to determine changes in the flow profile along the direction of flow on the basis of a comparison of signals of the second and third measurement arrangement.

12. The throughflow measurement system in accordance with claim 1,
    wherein the evaluation device is configured to determine a viscosity of the fluid on the basis of the determined flow profile.

13. The throughflow measurement system in accordance with claim 1,
    comprising a temperature measurement device, wherein the evaluation device is in signal connection with the temperature measurement device and is configured to modify the value for the fluid throughflow, which is determined by the first measurement arrangement, on the basis of a temperature detected by the temperature measurement device.

* * * * *